United States Patent Office 2,871,160
Patented Jan. 27, 1959

2,871,160
HYDROCORTISONE COMPOSITIONS AND METHOD FOR EXTEMPORANEOUS ADMINISTRATION

Richard H. Johnson and William P. Schneider, Kalamazoo Township, Kalamazoo County, Mich., assignors to The Upjohn Company, Kalamazoo, Mich., a corporation of Michigan No Drawing. Application July 1, 1955
Serial No. 519,628
9 Claims. (Cl. 167—77)

This invention relates to a novel composition of matter.

Hydrocortisone alone or in combination with other drugs is widely used for the control of inflammatory conditions and adrenocortical insufficiency. No entirely satisfactory preparation, however, has been available heretofore for the treatment of emergency conditions such as lupus erythematosus in relapse, Addisonian crisis, the Waterhouse-Friderichsen syndrome, emergency surgery, acute hypersensitive reactions, bi-lateral adrenalectomy, and other forms of acute adrenocorotical insufficiencies. Nor have entirely satisfactory water-soluble derivatives and/or preparations been available for any purpose.

The need for a preparation from which hydrocortisone could be released into the blood stream rapidly enough to provide the immediate response necessary in emergency conditions has been long recognized and this need has recently been partially fulfilled by a preparation containing hydrocortisone dissolved in ethyl alcohol. However, because of the concentration of ethyl alcohol, this preparation had to be diluted with plasma, plasma extender, saline solution, or the like before it could be safely introduced into the blood stream and even then had to be administered as an intravenous drip. The treatment required professional equipment and continued professional supervision such as could only be obtained in a hospital and therefore was not suitable for extemporaneous or emergency application outside of a hospital. The hydrocortisone preparations heretofore available therefore have not been adequate fully to meet the need for immediate hydrocortisone response in emergencies arising outside of a hospital.

It is an object of the invention to provide new and useful compositions of matter. It is a further object of the invention to prepare novel compositions of physiologically active derivatives of hydrocortisone which can be administered intravenously without difficulty and without requiring the use of special equipment or supervision and are suitable for extemporaneous and emergency use outside of hospitals. It is a further object of the invention to provide compositions of matter suitable for extemporaneous preparation of aqueous solutions containing a physiologically active, water-soluble derivative of hydrocortisone. It is a further object of the invention to provide stable aqueous solutions of a physiologically active, water-soluble derivative of hydrocortisone. It is a further object of the invention to avoid the disadvantages of the prior art and to obtain advantages as will be more particularly pointed out. Still other objects will become apparent as the description proceeds.

The compounds of the invention are prepared by reacting hydrocortisone with a dicarboxylic inner anhydride according to the following equation:

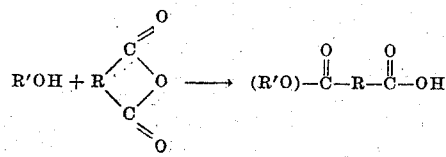

in which R'OH is hydrocortisone and R is the radical of a dicarboxylic inner anhydride. The term "dicarboxylic inner anhydride" is used herein to designate anhydrides as represented above which are obtained by intramolecular abstraction of water from the two carboxyl groups of a dicarboxylic acid. Thus R is the radical obtained by the removal of the two carboxyl groups from a dicarboxylic acid which is capable of being dehydrated to an inner anhydride.

Advantageously the acid esters are converted to their water-soluble salts, such as alkali and alkaline earth metal salts and ammonium salts (substituted and unsubstituted). Sterile aqueous solutions of these salts also are suitable for parenteral administration in accordance with this invention and have the advantage that more concentrated solutions can be formed.

Advantageously the aqueous solutions thus prepared are buffered with a neutral buffer, such as a phosphate buffer adjusted to neutrality. On hydrolysis of the esters of the invention, the liberated acid salt, unless neutralized by a neutral buffer, reacts with the ester salt, thereby freeing the relatively insoluble ester-acid. Hydrolysis, therefore, causes cloudiness due to precipitation of insoluble materials entirely out of proportion to the amount of ester hydrolyzed. Thus aqueous solutions according to the invention desirably are stabilized by means of a neutral buffer.

To further improve stability, the compounds of the invention are most suitably packaged as dry compositions. Advantageously an aqueous solution is sterilized by filtration and then lyophilized to give a dry, stable precipitate. The sterile solutions advantageously are lyophilized in sterile vials to which sterile aqueous vehicle can be added at the time of use for preparing sterile aqueous solutions suitable for intravenous injection. Suitably these vials can have a rubber cap which can be punctured by a hypodermic needle to introduce the sterile aqueous vehicle. Suitably also the sterile vehicle and the dry precipitate can be packaged in the separate compartments of a dual cartridge suitable for use in hypodermic syringes designed for first mixing a solid with a solvent and for thereafter injecting the solution thus formed into the patient.

Compositions most suitably adapted for use in preparing solutions for intravenous injection are obtained by coprecipitating the esters of the invention with a neutral buffer salt. Thus to an aqueous solution of the water-soluble ester-salt there is added a phosphate buffer adjusted to neutrality, that is, to a pH of 6.5 to 8.0. The solution is then filter-sterilized and lyophilized in a suitable vial, as described above, to give a dry powder of coprecipitated ester according to the invention, and neutral buffer salt.

In carrying out the process according to the invention, hydrocortisone-free alcohol is reacted with an excess of a carboxylic inner anhydride in a mutual solvent, advantageously, an organic base such as pyridine or lutidine. The reaction normally takes place within a few hours at room temperature. Gentle heating can be used but is generally undesirable. Also if the anhydride is sufficiently active or if a longer time is used, temperatures below room temperature can be used.

The product ester can be recovered from the reaction mixture by the usual procedures. Advantageously the product is precipitated by adding a liquid which is capable of precipitating the product as the free acid ester or a salt thereof. An aqueous solution of hydrochloric acid or like strong mineral acid can be used advantageously when pyridine or like organic base is used as the mutual solvent. Ordinarily it will be sufficient to pour the reaction mixture slowly into an excess of dilute aqueous hydrochloric acid and then filter off the precipitated product. The product can then be further purified by crystallization from a polar solvent such as acetone. Suitable other solvents include: methyl ethyl ketone, methanol, ethanol, i-propanol, β-ethoxyethanol, ethyl acetate and mixtures of same with Skellysolve B, ether, and water where the resulting solvent system is homogeneous.

The free acid ester thus produced can be converted to a salt by neutralization with the appropriate base. Advantageously the free acid ester can be dissolved in a volatile water-miscible solvent, such as acetone, and the solution neutralized by adding aqueous alkali or alcoholic alkali. Advantageously the pH is adjusted to about 7.2 to about 7.4. Other volatile water-miscible solvents include: methanol, ethanol, i-propanol, and dioxane. The solvent is then removed by vacuum distillation, first the volatile solvent and then the water. Advantageously the water is removed by lyophilization. Before lyophilization the water solution can be filter-sterilized if a sterile product is desired. Suitable bases are the alkali and alkaline earth metal hydroxides and carbonates, such as sodium, potassium, ammonium, calcium, and magnesium hydroxides and carbonates and lower molecular weight ammonium bases such as more particularly enumerated below.

According to a preferred procedure a buffer salt is incorporated in the aqueous solution of the ester-salt obtained by removal of the volatile solvent so that the ester-salt and the buffer are coprecipitated during the lyophilization or otherwise removal of the water. As buffer suitable quantities of mono- and di-sodium orthophosphates can be dissolved in the aqueous solution of ester-salt and the pH adjusted to the desired value. If salts other than the sodium ester-salt is desired, the corresponding bases or phosphate-salts are used. Other acids having a weakly acidic function having a pKa close to the desired pH of 6.5 to 8.0 can be used in place of the phosphoric acid in accordance with the well recognized principles of buffering.

In preparing compounds according to the invention any dicarboxylic inner anhydride can be used. It is well known that dicarboxylic inner anhydrides as a class are alcoholized readily by compounds having active hydroxyl hydrogen to form acid esters, and it has been found according to this invention that such an alcoholysis is also obtained with hydrocortisone to give the corresponding ester-acids. As is well known, the dicarboxylic inner anhydrides which so react can contain a five-, six-, or seven-membered ring structure, such as are exemplified by succinic anhydride, glutaric anhydride, and adipic anhydride, respectively, and the corresponding unsaturates such as maleic anhydride, which ring structure can be substituted by alkyl, alkenyl, alkylidene, alkoxy, carboxy, aralkyl, aryl, cycloalkyl, cycloalkenyl, and halo groups, or can comprise bicylic and polycylic groups such as are obtained by the diene synthesis from maleic anhydride and conjugated olefins such as butadiene, cyclopentadiene, furan, and the like. Representative dicarboxylic inner anhydrides include succinic anhydride and derivatives thereof, such as, methylsuccinic anhydride, dimethylsuccinic anhydride (symmetrical and unsymmetrical), mono-, di-, chloro-, and bromosuccinic anhydrides, α,β - dichloro - α,β - dimethylsuccinic anhydride, α,β - dimethoxysuccinic anhydride, α,β - diethoxysuccinic anhydride, methoxysuccinic anhydride, ethoxysuccinic anhydride, itaconic anhydride, homoitaconic anhydride, benzylsuccinic anhydride, 2,4 - dimethoxyphenylsuccinic anhydride, N-benzoylaspartic anhydride, phenylsuccinic anhydride, cyclohexylsuccinic anhydride, cyclohexenylsuccinic anhydride, cyclopentylsuccinic anhydride, and alkenylsuccinic anhydrides, such as allylsuccinic anhydride, isobutenylsuccinic anhydride, octenylsuccinic anhydrides, e. g., diisobutenylsuccinic anhydride, nonenylsuccinic anhydrides, e. g., tripropenylsuccinic anhydride, 3-phenylallylsuccinic anhydride, 2,5-hexadien-1-ylsuccinic anhydride, and the like; maleic anhydride and derivatives thereof, such as citraconic anhydride, homocitraconic anhydride (ethylmaleic anhydride), pyrocinchonic anhydride (dimethylmaleic anhydride), xeronic anhydride (diethylmaleic anhydride), ethoxymaleic anhydride, phenyl and p-chlorophenylmaleic anhydride, chloromaleic anhydride, dichloromaleic anhydride, and ethylmethylmaleic anhydride; aconitic anhydride and tricarballylic anhydride; phthalic anhydride and derivatives thereof, such as hexahydrophthalic anhydride, Δ⁴-cis-tetrahydrophthalic anhydride, endocis-bicyclo-[2.2.1]-5-heptene-2-3-dicarboxylic anhydride, 7-oxabicyclo-[2.2.1]-5-heptene-2,3-dicarboxylic anhydride (furanmaleic anhydride adduct), pyromellitic anhydride, and the like; naphthalic anhydride; diglycolic anhydride; thiodiglycolic anhydride; cyclobutane-1,2-dicarboxylic anhydride; iminodiacetic anhydride (diglycoloimide); 3-terpinolene-succinic anhydride; 3,5-diethoxy-2,4-cyclohexadiene-1,2-dicarboxylic anhydride; 1,2,3,4-tetrahydro-3-methyl-6,7-methylenedioxy-1,2-naphthalene dicarboxylic anhydride (the maleic anhydride adduct of isosafrole); homophthalic anhydride; cinchomeronic anhydride; quinolinic anhydride; 4 - tertiarybutylmercapto-5-methyl-4-cyclohexene-1,2-dicarboxylic anhydride; 1,2-cyclopentanedicarboxylic anhydride; 1,2-dimethyl-1,2-cyclopropanedicarboxylic anhydride; 1-cyclopentene-1,2-dicarboxylic anhydride, and the like; glutaric anhydride, α-methylglutaric anhydride, β-methylglutaric anhydride, α-ethylglutaric anhydride, β-ethylglutaric anhydride, α,α-dimethylglutaric anhydride, α,β-dimethylglutaric anhydride, α,γ-dimethylglutaric anhydride, β,β-dimethylglutaric anhydride, α-isopropylglutaric anhydride, β-isopropylglutaric anhydride, α-propylglutaric anhydride, β-propylglutaric anhydride, α-ethyl-β-methylglutaric anhydride, β-ethyl-β-methylglutaric anhydride, α,α,β-trimethylglutaric anhydride, α,α,γ-trimethylglutaric anhydride, α,β,β-trimethylglutaric anhydride, α,β,γ-trimethylglutaric anhydride, β-isobutylglutaric anhydride, α,α-diethylglutaric anhydride, α-methyl-β-isopropylglutaric anhydride, β-methyl-β-isopropylglutaric anhydride, α-ethyl-β,β-dimethylglutaric anhydride, α,α,β,β-tetramethylglutaric anhydride, α,α,γ,γ-tetramethylglutaric anhydride, α,β,β,γ-tetramethylglutaric anhydride, β-amylglutaric anhydride, α-methyl-γ-isobutylglutaric anhydride, β-ethyl-β-propylglutaric anhydride, β-methyl-β-butylglutaric anhydride, β-methyl-β-isobutylglutaric anhydride, and the like.

The novel compounds of this invention are solids, usually crystalline, and can be represented by the following general formula:

$$(R'O)-\overset{O}{\underset{\|}{C}}-R-\overset{O}{\underset{\|}{C}}-OH$$

in which R'O is the hydrocortisone radical, i. e., R' is the radical left when hydrogen is removed from the 21-hydroxy group of hydrocortisone and R is as defined above. From the examples given above, R can be exemplified by the groups:

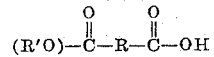
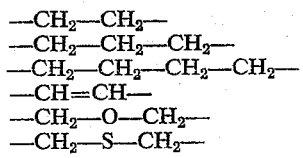

and

wherein hydrogen can be replaced by alkyl, alkenyl, alkylidene, alkoxy, carboxy, cycloalkyl, cycloalkenyl, aryl, aralkyl, and halo groups, advantageously containing not more than eight carbon atoms; and wherein vicinal carbon atoms can be linked together by a polyvalent radical forming therewith a cylic structure which can be mono- or polycyclic, carbocyclic or heterocyclic, or mixed carbocyclic and heterocyclic structures as exemplified above.

From the examples given above, the polyvalent radical can be exemplified by the following groups:

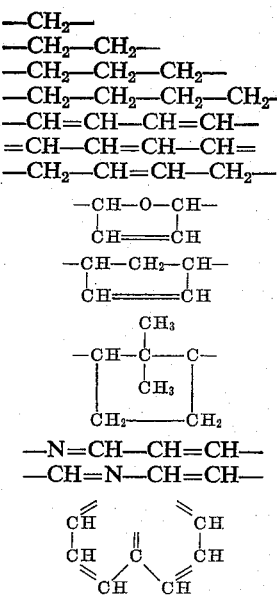

In the presence of a base salts are formed. Thus the ester-acids of the invention form salts with the alkali metal and alkaline earth metal bases such as sodium, potassium, lithium, ammonium, calcium, barium, strontium, and magnesium hydroxides and carbonates, and basic amines such as mono-, di-, and trimethylamines, mono-, di-, and triethylamines, mono-, di-, and triisopropylamines, ethyldimethylamine, benzyldiethylamine, cyclohexylamine, dibenzylamine, and like N,N-dibenzylethylene diamine, bis-ortho-methoxy-N-methyl ortho-phenylisopropylamine, methoxyphenylisopropylamine, loweraliphatic, lower-cycloaliphatic, and lower-araliphatic amines up to and including about eight carbon atoms; heterocyclic amines such as piperidine, morpholine, pyrrolidine, piperazine, and the lower-alkyl derivatives thereof, such as, 1-methylpiperidine, 4-ethylmorpholine, 1-isopropylpyrrolidine, 1,4-dimethylpiperazine, 1-n-butylpiperidine, 2-methylpiperidine, 1-ethyl-2-methylipiperidine, and the like. Amines containing water-solubilizing or hydrophilic groups such as mono-, di-, and triethanolamines, ethyldiethanolamine, n-butylmonoethanolamine, 2-amino-1-butanol, 2-amino-2-ethyl-1,3-propanediol, 2-amino-2-methyl-1-propanol, tris (hydroxymethyl) aminomethane, phenylmonoethanolamine, p-tertiaryamylphenyldiethanol amine, and galactamine, N-methyl glucamine, N-methyl glucosamine, ephedrine, phenylephrine, epinephrine, procaine, and the like. These salts can be represented by the formula:

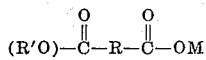

where M is a cation (ammonium ion or metal ion).

The following examples are illustrative of the process and products of the invention but are not to be construed as limiting.

*Example 1.—Hydrocortisone 21-hemisuccinate*

A solution was prepared by stirring 25 grams of succinic anhydride in 250 milliliters of pyridine. With continued stirring 25 grams of powdered hydrocortisone was added gradually over a period of two or three minutes. The stirring was continued until the steroid was dissolved and the reaction mixture allowed to stand at room temperature for twenty hours. The reaction mixture was then gradually (over a period of five minutes) poured, with stirring, into a cold hydrochloric acid solution prepared by vigorously stirring 300 milliliters of concentrated hydrochloric acid into 1250 grams of ice in one liter of water. The stirring was then continued for thirty minutes. The reaction mixture was then filtered and the cake washed with water (ca. 500 milliliters) until the filtrate had a pH of four or higher and dried under vacuum at 50–60 degrees centigrade. Following the above procedure a yield of 32 grams (100 percent of theory) of hydrocortisone 21-hemisuccinate, melting point 166 to 169 degrees centigrade was obtained.

The above product was dissolved in 125 milliliters of acetone at fifty degrees centigrade. This solution was treated with 2.5 grams of decolorizing carbon, filtered and the cake washed with 25 milliliters of acetone. The filtrate and washings were reheated to fifty degrees and diluted with 120 milliliters of water, seeded with hydrocortisone 21-hemisuccinate, stirred for thirty minutes, and allowed to crystallize at room temperature for sixteen hours. The crystals were filtered off, washed (1) with fifteen milliliters of acetone and (2) with twenty milliliters of water, and dried under vacuum at 50–60 degrees centigrade. Following this procedure there was obtained a yield of 26.8 grams (89.4 percent of theory) of hydrocortisone 21-hemisuccinate, melting point 170–172 degrees centigrade $[\alpha]_D$ plus 125 degrees (acetone), $E_{243}$ 16,375 (ethanol).

*Example 2.—Sodium hydrocortisone 21-succinate*

A solution was prepared by warming 400 grams of hydrocortisone 21-hemisuccinate, melting point 170–172 degrees centigrade in 1.5 liters of acetone and cooling to room temperature. With good stirring, 1600 milliliters of 0.5 normal aqueous sodium hydroxide was added gradually over a period of ten minutes. The pH should not be allowed to rise above about pH 7.5. The end point adjustment was made by adding ten-milliliter portions of 0.5 normal aqueous sodium hydroxide until a ten-milliliter test portion, when diluted with ten milliliters of water, had a pH of 7.2 to 7.4. About eighty milliliters was required. The reaction mixture was then concentrated to about two liters in an atmosphere of nitrogen and under vacuum. The pot temperature should not exceed about 26 degrees centigrade. The concentrate was treated with fifteen grams of diatomaceous earth, filter-sterilized and lyophilized. Following this procedure there was obtained 405 grams (96.6 percent of theory) of sodium hydrocortisone 21-succinate, a white, amorphous, odorless, hygroscopic solid having the following properties:

(1) Hydrocortisone equivalent (u. v. in 95 percent ethanol); calculated, 74 to 79 percent; found, 72.6 percent (2) pH (200 milligrams per ten milliliters) 6.6

(3) Insoluble in chloroform and methylene chloride; very slightly soluble in acetone; slightly soluble in dioxan and cyclohexanone; very soluble in water (greater than fifty grams per 100 milliliters of water), 95 percent ethanol, and methanol (4) Specific rotation, $[\alpha]_D^{25}$ plus 140° ±6° (0.25 gram in 25 milliliters 95 percent ethanol)

(5) U. v. absorption at 242 m$\mu$ [specific absorbency, $E_1^1$ cm., 330° ±10°]

*Example 3.—N-methylglucamine salt of hydrocortisone 21-hemisuccinate*

A solution was prepared by dissolving 9.2 grams of hydrocortisone 21-hemisuccinate and 3.82 grams of N-methylglucamine in 25 milliliters of water. An additional 200 milligrams of hydrocortisone 21-hemisuccinate was then added and the suspension stirred for ten minutes and filtered. The solution was then lyophilized. Following this procedure there was obtained thirteen grams (100 percent of theory) of the N-methylglucamine salt of hydrocortisone 21-hemisuccinate.

*Example 4.—Galactamine salt of hydrocortisone 21-hemisuccinate*

A solution was prepared by dissolving 100 milligrams of hydrocortisone 21-hemisuccinate and 39 milligrams of galactamine in ten milliliters of boiling methanol. The methanol was evaporated, the residue taken up in five milliliters of water and the water solution lyophilized. By this procedure there was obtained about 100 milligrams of the galactamine salt of hydrocortisone 21-hemisuccinate as an amorphous solid.

*Example 5.—Procaine salt of hydrocortisone 21-hemisuccinate*

A solution of 3.25 grams of procaine hydrochloride in 25 milliliters of water and ten milliliters of ten percent aqueous sodium hydroxide was extracted twice with thirty-milliliter portions of methylene chloride. To the sixty milliliters of extract was added ten milliliters of methanol and five grams of hydrocortisone 21-hemisuccinate and the resulting solution evaporated to dryness under vacuum. By this procedure there was obtained 7.08 grams (96.4 percent of theory) of the procaine salt of hydrocortisone 21-hemisuccinate as a finely divided resinous product having a mildly bitter taste and a slight local anesthetic action on the tip of the tongue.

*Example 6.—N,N'-dibenzylethylenediamine salt of hydrocortisone 21-hemisuccinate*

A solution of nine grams of hydrocortisone 21-hemisuccinate and 2.56 grams of N,N'-dibenzylethylenediamine in 100 milliliters of methylene chloride was heated under reflux for ten minutes and then concentrated to a thick syrup and dried under vacuum. By this procedure there was obtained a yield of 11.5 grams (99 percent of theory) of the N,N'-dibenzylethylenediamine salt of hydrocortisone 21-hemisuccinate as a finely divided resinous material.

*Example 7.—The bis-ortho-methoxyphenylisopropylamine salt of hydrocortisone 21-hemisuccinate*

By the procedure of Example 6 using nine grams of hydrocortisone 21-hemisuccinate, 5.8 grams of bis-ortho-methoxyphenylisopropylamine, and ninety milliliters of methylene chloride, there was obtained 14.9 grams (100 percent of theory) of bis-ortho-methoxyphenylisopropylamine salt of hydrocortisone 21-hemisuccinate as an amorphous resin.

*Example 8.—The cyclohexylamine salt of hydrocortisone 21-hemisuccinate*

By the procedure of Example 6 using one gram of hydrocortisone 21-hemisuccinate, 214 milligrams of cyclohexylamine, and twenty milliliters of methylene chloride, there was obtained 1.24 grams (100 percent of theory) of the cyclohexylamine salt of hydrocortisone 21-hemisuccinate.

*Example 9.—The dibenzylamine salt of hydrocortisone 21-hemisuccinate*

By the procedure of Example 6 using one gram of hydrocortisone 21-hemisuccinate, 286 milligrams dibenzylamine, and ten milliliters of methylene chloride, there was obtained 860 milligrams (69 percent of theory) of the dibenzylamine salt of hydrocortisone 21-hemisuccinate as a finely divided amorphous solid.

*Example 10.—The ephedrine salt of hydrocortisone 21-hemisuccinate*

By substituting ephedrine hydrochloride for the procaine hydrochloride of Example 5, the ephedrine salt of hydrocortisone 21-hemisuccinate was obtained.

*Example 11.—The epinephrine salt of hydrocortisone 21-hemisuccinate*

By substituting the procaine hydrochloride of Example 5 by epinephrine hydrochloride, the epinephrine salt of hydrocortisone 21-hemisuccinate was obtained.

*Example 12.—The phenylephrine salt of hydrocortisone 21-hemisuccinate*

By substituting phenylephrine hydrochloride for procaine hydrochloride in Example 5, the phenylephrine salt of hydrocortisone 21-hemisuccinate was obtained.

Following the procedures of Examples 3 through 12, there are obtained the corresponding amine salts of the 21-hemiglutarate, 21-hemi-$\beta$-methylglutarate, 21-hemi-$\beta$,$\beta$-dimethylglutarate, 21-hemidiglycolate, 21-hemi-[endo-cis-bicyclo(2.2.1)-5-heptene-2,3-dicarboxylate], and 21-hemihexahydrophthalate of hydrocortisone.

By substituting the succinic anhydride in Examples 1 and 2 by other carboxylic inner anhydrides, the following novel compounds were obtained:

*Example 13.*—Hydrocortisone 21-hemiglutarate, melting point 99–102 degrees centigrade.

*Example 14.*—Sodium hydrocortisone 21-glutarate, a water-soluble, white, amorphous solid.

*Example 15.*—Hydrocortisone 21-hemi-$\beta$-methylglutarate, melting point 193–201 degrees centigrade.

*Example 16.*—Sodium hydrocortisone 21-$\beta$-methylglutarate, a water-soluble, white, amorphous solid.

*Example 17.*—Hydrocortisone 21-hemi-$\beta$,$\beta$-dimethylglutarate, melting point 183.5–186 degrees centigrade.

*Example 18.*—Sodium hydrocortisone 21-$\beta$,$\beta$-dimethylglutarate, a water-soluble, white, amorphous solid.

*Example 19.*—Hydrocortisone 21-hemidiglycolate, melting point 209–212 degrees centigrade.

*Example 20.*—Sodium hydrocortisone 21-diglycolate, a water-soluble, white, amorphous solid.

*Example 21.*—Hydrocortisone 21-hemi-[endo-cis-bicyclo(2.2.1)-5-heptene-2,3-dicarboxylate], an amorphous solid which softened beginning at 120 degrees when heated.

*Example 22.*—Sodium hydrocortisone 21-[endo-cis-bicyclo(2.2.1)-5-heptene-2,3-dicarboxylate].

*Example 23.*—Hydrocortisone 21-hemihexahydrophthalate, an amorphous solid softening about 100 degrees on heating.

*Example 24.*—Sodium hydrocortisone 21-hexahydrophthalate.

*Example 25.*—Intravenous preparation.

A solution was prepared by dissolving 9.2 grams of sodium biphosphate U. S. P. XIV (monosodium orthophosphate), 38.0 grams of sodium phosphate exsiccated U. S. P. XIV (disodium orthophosphate), and 668.5 grams of sodium hydrocortisone 21-hemisuccinate (Example 2) in 8.5 liters of Water for Injection, U. S. P. XIV. The volume was then adjusted to ten liters by adding Water for Injection. The resulting solution was sterilized by filtration and the sterile filtrate was then filled into sterile five cubic centimeter bottles and lyophilized in the bottles. Each bottle was filled with two milliliters of the solution and after lyophilization contained a sterile powder containing 133.7 milligrams of sodium hydrocortisone 21-hemisuccinate (equivalent by weight to 100 milligrams of hydrocortisone).

Instead of using the sodium salt in Example 25, any of the above-mentioned amine salts can be used. In such cases, it is desirable, but not necessary, also to substitute the sodium phosphates by the corresponding amine salts. The alkaline earth metal salts such as calcium, barium, strontium, and magnesium can be used. Also the unsubstituted ammonium salt and other alkali metal salts can be used.

Following the procedures given in the foregoing examples using the dicarboxylic inner anhydrides listed above, there are obtained the 21-hemimethylsuccinate, 21-hemi-$\alpha$,$\beta$-dimethylsuccinate, 21-hemi-$\alpha$,$\alpha$-dimethylsuccinate, 21-hemichlorosuccinate, 21-hemibromosuccinate, 21-hemi-$\alpha$,$\beta$-dichlorosuccinate, 21-hemi-$\alpha$,$\beta$-dibromosuccinate, 21-hemiphenylsuccinate, 21-hemi-$\alpha$,$\beta$-dichloro-$\alpha$,$\beta$-dimethylsuccinate, 21-hemicyclohexylsuccinate, 21-hemicyclopentylsuccinate, 21-hemicyclohexenylsuccinate, 21-hemi-$\alpha$,$\beta$-dimethoxysuccinate, 21-hemi-$\alpha$,$\beta$-diethoxysuccinate, 21-hemimethoxysuccinate, 21-hemiethoxysuccinate, 21-hemiitaconate, 21-hemihomoitaconate, 21-hemibenzylsuccinate, 21-hemiallylsuccinate, 21-hemi-3-phenylallylsuccinate, 21-hemiisobutenylsuccinate, 21-hemitripropenylsuccinate, 21-hemi-2,5-hexadien-1-ylsuccinate, 21-hemicitraconate, 21-hemihomocitraconate, 21-hemipyrocinchonate, 21-hemidimethylmaleate, 21-hemiethylmaleate, 21-hemixeronate, 21-hemiethoxymaleate, 21-hemiphenylmaleate, 21-hemi-p-chlorophenylmaleate, 21-hemichloromaleate, 21-hemidichloromaleate, 21-hemiethylmethylmaleate, 21-hemi-7-oxabicyclo[2.2.1]-5-heptene-2,3-dicarboxylate, 21-hemiadipate, 21-hemithiodiglycolate, 21-hemicyclobutane-1,2-dicarboxylate, 21-hemiiminodiacetate, 21-hemi-3-terpinolenesuccinate, 21-hemi-2,4-dimethoxyphenylsuccinate, 21-hemi-N-benzoylaspartate, 21-hemi-3,5-diethoxy-2,4-cyclohexadiene-1,2-dicarboxylate, 21-hemi-1,2,3,4-tetrahydro-3-methyl-6,7-methylenedioxy-1,2-naphthalene dicarboxylate, 21-diacid aconitate, 21-diacid tricarballylate, 21-hemiphthalate, 21-hemihomophthalate, 21-hemicinchomeronate, 21-hemiquinolinate, 21-hemi-4-tertiarybutylmercapto-5-methyl-4-cyclohexene-1,2-dicarboxylate, 21-hemi-1,2-cyclopentanedicarboxylate, 21-hemi-1,2-dimethyl-1,2-cyclopropanedicarboxylate, 21-hemi-1,2-cyclopentene-1,2-dicarboxylate, 21-hemi-α-methylglutarate, 21-hemi-α-ethylglutarate, 21-hemi-β-ethylglutarate, 21-hemi-α,α-dimethylglutarate, 21-hemi-α,β-dimethylglutarate, 21-hemi-α,γ-dimethylglutarate, 21-hemi-α-isopropylglutarate, 21-hemi-β-isopropylglutarate, 21-hemi-α-propylglutarate, 21-hemi-β-propylglutarate, 21-hemi-α-ethyl-β-methylglutarate, 21-hemi-β-ethyl-β-methylglutarate, 21-hemi-α,α,β-trimethylglutarate, 21-hemi-α,α,γ-trimethylglutarate, 21-hemi-α,β,β-trimethylglutarate, 21-hemi-α,β,γ-trimethylglutarate, 21-hemi-β-isobutylglutarate, 21-hemi-α,α-diethylglutarate, 21-hemi-α-methyl-β-isopropylglutarate, 21-hemi-β-methyl-β-isopropylglutarate, 21-hemi-α-ethyl-β,β-dimethylglutarate, 21-hemi-α,α,β,β-tetramethylglutarate, 21-hemi-α,α,γ,γ-tetramethylglutarate, 21-hemi-α,β,β,γ-tetramethylglutarate, 21-hemi-β-amylglutarate, 21-hemi-α-methyl-γ-isobutylglutarate, 21-hemi-β-methyl-β-butylglutarate, 21-hemi-β-methyl-β-isobutylglutarate, and 21-hemi-β-ethyl-β-propylglutarate of hydrocortisone.

Each of the above ester-acids can be converted to salts by neutralization with the inorganic and organic bases listed above.

Other therapeutic materials can be incorporated in formulations containing water-soluble compositions of this invention to form new and very valuable compositions. Such therapeutic materials include antibacterial agents such as penicillins such as penicillin G, penicillin O, procaine penicillin, N,N'-dibenzylethylenediamine dipenicillin, and the like, bacitracin, tetracycline, chlortetracycline, oxytetracycline, chloramphenicol, streptomycin, dihydrostreptomycin, erythromycin, circulin, endomycin, tyrothricin, gramicidin, and the like, sorbic acid, nitrofurazone, chloroazodin, hexachlorophene, undecylenic acid, propionic acid, sodium and/or zinc caprylate, lower alkyl p-hydroxybenzoates, and the like, sulfonamides such as sodium sulfacetamide, sulfisoxazole diethanolamine, 4-aminomethylbenzenesulfonamide hydrochloride, sulfadiazine, sulfamerazine, sulfamethazine, and the like, or mixtures of these antibacterial agents in combination with the selected water-soluble corticosteroid.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A method for the extemporaneous treatment of acute adrenocortical insufficiency which comprises dissolving in water for injection a dry, sterile powder containing a unit dose of a pharmacologically acceptable, water-soluble salt of an acid ester of hydrocortisone and a dicarboxylic acid containing at least four and not more than sixteen carbon atoms and intravenously injecting the solution thus formed into the patient.

2. A method for the extemporaneous treatment of acute adrenocortical insufficiency which comprises dissolving in water for injection a dry, sterile powder containing a unit dose of a pharmacologically acceptable, water-soluble salt of hydrocortisone hemisuccinate and intravenously injecting the solution thus formed into the patient.

3. A method for the extemporaneous treatment of acute adrenocortical insufficiency which comprises dissolving in water for injection a dry, sterile powder containing a unit dose of sodium hydrocortisone hemisuccinate and intravenously injecting the solution thus formed into the patient.

4. A sterile aqueous solution of a pharmacologically acceptable water-soluble salt of hydrocortisone 21-hemisuccinate buffered at a pH of between about 6.5 and 8.0 by a corresponding salt of an acid having a pKa of about 6.5 to 8.0.

5. A sterile aqueous solution of the sodium salt hydrocortisone 21-hemisuccinate buffered at a pH of between about 6.5 and 8.0 by a neutral phosphate buffer.

6. A sterile, water-soluble powder comprising a pharmacologically acceptable, water-soluble salt of an acid ester of hydrocortisone and a hydrocarbon dicarboxylic acid containing at least four and not more than sixteen carbon atoms coprecipitated with a neutral buffer from a neutral aqueous solution by lyophilization of said solution, said neutral buffer being a salt of an acid having a pKa of about 6.5 to 8.0, the cation of which is the same as that of said pharmacologically acceptable, water-soluble salt.

7. A sterile, water-soluble powder comprising sodium hydrocortisone succinate, coprecipitated with a neutral sodium phosphate buffer from a neutral aqueous solution by lyophilization of said solution.

8. A method for the extemporaneous treatment of acute adrenocortical insufficiency which comprises dissolving in water for injection a unit dose of a sterile, water-soluble powder according to claim 6 and intravenously injecting the solution thus formed into the patient.

9. A method for the extemporaneous treatment of acute adrenocortical insufficiency which comprises dissolving in water for injection a unit dose of a sterile, water-soluble powder according to claim 7 and intravenously injecting the solution thus formed into the patient.

References Cited in the file of this patent
UNITED STATES PATENTS 2,183,589   Reichstein _____ Dec. 19, 1939
2,656,366   Minlon _____ Oct. 20, 1953

OTHER REFERENCES

Fried et al.: J. A. C. S., 76 pp. 1455–1456, March 5, 1954.

Drug and Cos. Ind., February 1953, page facing page 200.

Cortone and Hydrocortone News, No. 15, Merck and Co., April 1953.